E. S. SHAW.
VEHICLE SIGNAL APPARATUS.
APPLICATION FILED MAY 20, 1916.
1,213,282. Patented Jan. 23, 1917.
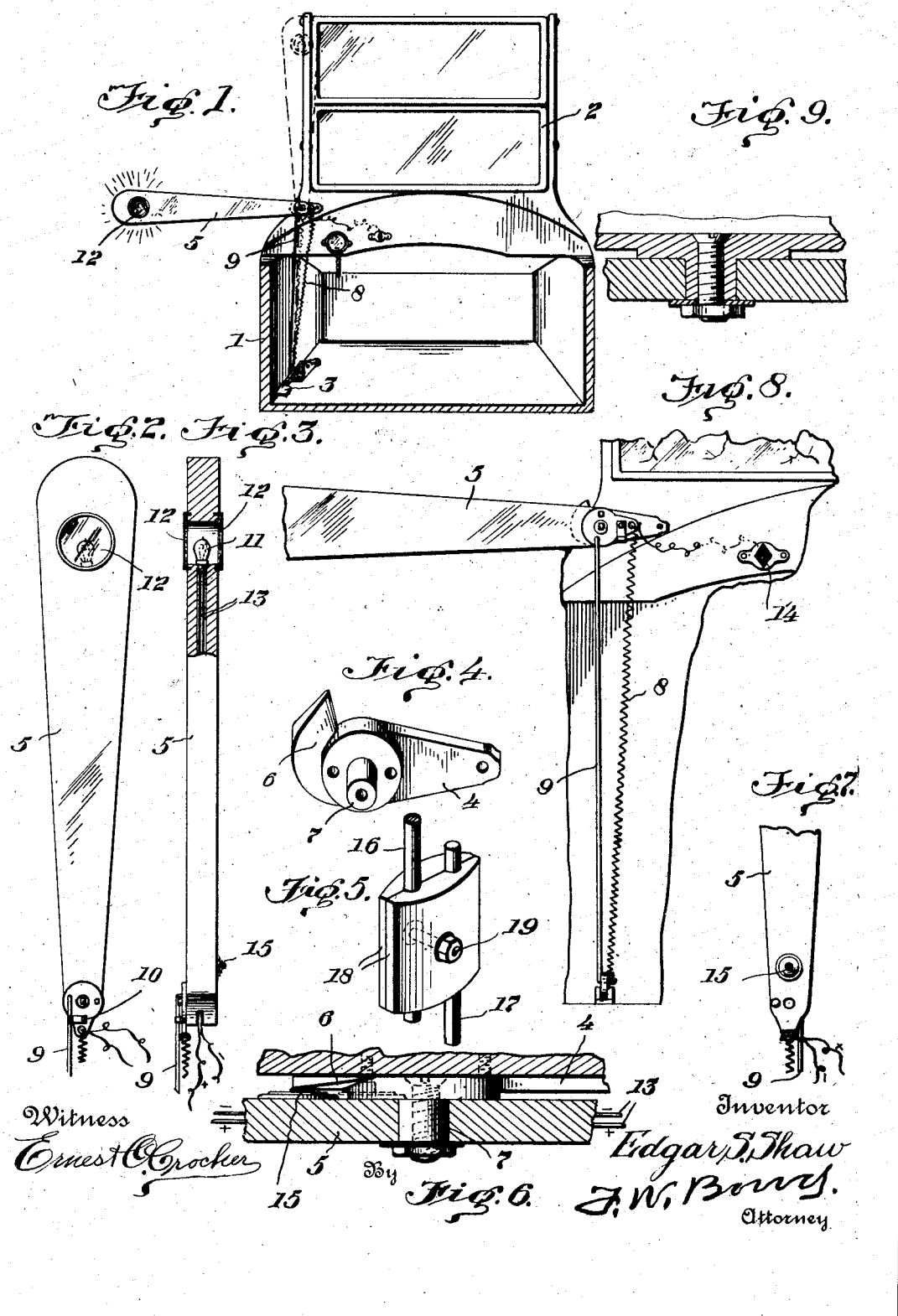

UNITED STATES PATENT OFFICE.

EDGAR S. SHAW, OF MINERVA, OHIO.

VEHICLE SIGNAL APPARATUS.

1,213,282.  Specification of Letters Patent.  Patented Jan. 23, 1917.

Application filed May 20, 1916. Serial No. 98,828.

*To all whom it may concern:*

Be it known that I, EDGAR S. SHAW, a citizen of the United States, residing at Minerva, in the county of Carroll and State of Ohio, have invented a new and useful Vehicle Signal Apparatus, of which the following is a specification.

The present invention has reference to vehicle signal apparatus, more specifically designed to be used in connection with automobiles.

The objects of the present invention are, first, to provide simple means for giving proper signals, and second, to provide means for operating the signal without decreasing the efficiency of an operator in guiding and manipulating the automobile. These objects, together with other objects readily apparent to those skilled in the art, may be attained by the construction illustrated in the accompanying drawings, although the invention may be embodied in other forms, the construction illustrated being chosen by way of example.

In the accompanying drawings: Figure 1 is a perspective view showing my improvements properly attached to an automobile. Fig. 2 is a view of the signal arm and semaphore. Fig. 3 is an edge view of the signal arm and semaphore, showing parts in section. Fig. 4 is a detached view of the pivot and switch actuating bracket. Fig. 5 is a view showing the signal arm actuating rod coupling. Fig. 6 is an enlarged sectional view showing a portion of the signal arm and a portion of the automobile casing, also showing an edge view of the pivot and switch actuating bracket properly connected. Fig. 7 is a view showing a portion of the signal arm and illustrating the semaphore switch. Fig. 8 is a view showing a portion of the signal arm and illustrating its relative position when properly placed in position upon the automobile and illustrating the light controlling switch. Fig. 9 is a sectional view showing a portion of the signal arm and the pivot and switch actuating bracket, showing the parts properly connected together.

Similar numerals of reference indicate corresponding parts throughout the several figures of the drawings.

In the accompanying drawing, 1 represents a portion of the body which may be of any desired construction of standard makes of automobiles, the body does not have to do with the present invention so far as the detail construction is concerned. 2 represents an ordinary wind shield, which is of any ordinary construction. Upon the floor of the body 1 is pivotally connected the foot-lever 3 and is located at a point where it can be reached by the foot of the chauffeur. Upon the body of the automobile at the proper place is connected the signal arm and switch actuating bracket 4, which may be of the form shown in Fig. 4, but the form may have to be changed somewhat to be properly connected to different forms of automobile bodies. The only object of the bracket is to provide means for pivotally connecting the signal arm 5 and also to provide means for actuating the semaphore switch by means of the cam 6.

The signal arm is pivotally mounted upon the short stud or bearing 7, best illustrated in Fig. 4. The signal arm and switch actuating bracket 4 is securely connected by any convenient and well known means. The signal arm 5 is extended inward a short distance and to the inner end is attached the top or upper end of the spring 8, the lower end of said spring being connected to the foot lever 3, by which arrangement the signal arm 5 will be normally held in the position illustrated in the dotted lines Fig. 1 and the foot lever 3 held in elevated position or in the position to be pressed downward by the foot to bring the signal arm 5 into the position shown in full lines Figs. 1 and 8.

For the purpose of actuating the signal arm 5 by the foot lever the connecting rod is provided which connecting rod is connected to the signal arm 5 at its upper end and upon the opposite side of the pivotal point of the signal arm from that of the spring 8; the lower end of the rod 9 is connected to the foot lever 3. In order to insure the rod 9 to actuate the signal arm when the lever 3 is pressed down the flange 10 is provided, which flange is so located that the downward pull of the connecting rod 9 will always be such as to move the signal arm 5 to bring it into the position shown in full lines, Figs. 1 and 8.

To the outer end of the signal arm is connected in any convenient and well known manner the electric lamp 11, which is inclosed by the lenses 12, which lenses may be of any desired color such as are commonly used for signaling purposes. It will be understood that the usual wires 13 must be connected to the lamp and extended and connected to the controlling switch 14 from which switch wires lead to a battery, but the particular arrangement of the battery wires and the particular arrangement of the controlling switch 14 does not have to do with the present invention, but must be present in order to carry out the objects of the present invention. It will also be understood that when the signal arm 5 is in its normal position the lamp 11 should be cut out, but when the signal arm is brought into its signaling position, the lamp should be cut in, or in other words the circuit closed. This being especially desirable at night, or at such times as it may be necessary to employ a light for proper signaling.

For the purpose of cutting the lamp 11 in and out the signal arm 5 is provided with a contact switch, which consists of the usual push button style, the push button 15 being so arranged that when the signal arm is brought into the lowered position the circuit as between the battery and the lamp 11 will be closed, the push button 15 being actuated by the cam 6, the cam 6 being so formed and shaped that the lamp will be cut in when the signal arm is actuated by the foot lever 3. I prefer to so form the cam 6 that the lamp will be cut in before the signal arm 5 has been brought into a horizontal position. In use it is preferable to have the lamp cut in just after the signal arm 5 has been started from its normal position and cut out just before it reaches its normal position, thereby better indicating in the night time the movements of the signal arm.

In some instances it is desirable to adjust the length of the connecting rod 9 and in order to provide for this adjustment in case it is desired, the connecting rod 9, shown in Fig. 1, should be made up of two sections or parts 16 and 17, and said parts coupled together by the coupling blocks 18 and the clamping bolt 19. I have not illustrated the coupling device in Fig. 1, but when the same is used it may be located between the signal arm 5 and the foot-lever 3.

I claim:

In a device of the character described, the combination of a vehicle body, a bracket held in fixed position with reference to said body, said bracket provided with a cam-face, a signal arm pivotally mounted and carried by said bracket, a foot lever pivotally connected to the vehicle body below the signal arm, a rod connected to said foot lever and to the signal arm, a spring connected to the foot lever and signal arm and a light signal carried by said signal arm, a switch carried by the signal arm, the cam of the fixed bracket adapted to actuate the switch by the movements of the signal arm, and a flange carried by the signal arm adapted for contact with the actuating rod.

In testimony that I claim the above, I have hereunto subscribed my name.

EDGAR S. SHAW.